May 12, 1964 W. ZEIDLER 3,132,725
SINGLE TUBE HYDRAULIC SHOCK ABSORBER
Original Filed April 23, 1959
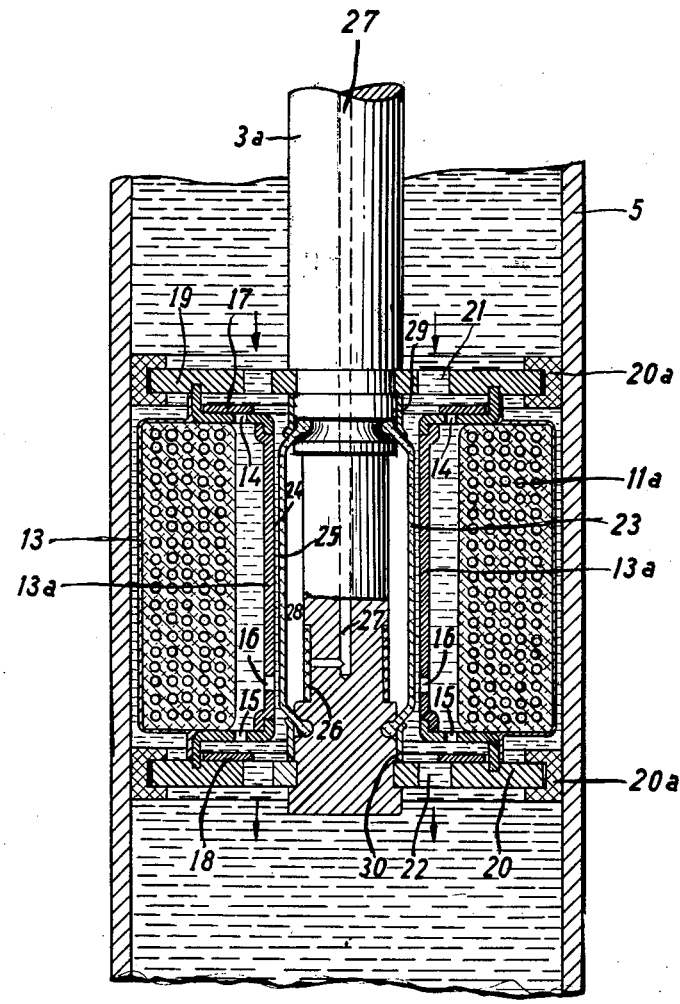
Inventor:
Willi Zeidler
By
Watson Cole Grindle + Watson
Attys

United States Patent Office 3,132,725
Patented May 12, 1964

3,132,725
SINGLE TUBE HYDRAULIC SHOCK ABSORBER
Willi Zeidler, Dusseldorf, Germany, assignor to Firma Rheinmetall G.m.b.H., Dusseldorf, Germany
Original application Apr. 23, 1959, Ser. No. 808,424, now Patent No. 3,056,473, dated Oct. 2, 1962. Divided and this application Aug. 3, 1962, Ser. No. 214,713
Claims priority, application Germany Apr. 30, 1958
4 Claims. (Cl. 188—88)

The invention relates to a single tube hydraulic shock absorber and is a division of the copending application Serial No. 808,424, filed April 23, 1959, Patent No. 3,056,473 issued October 2, 1962.

In said Patent No. 3,056,473 there is described a hydraulic shock absorber particularly for power vehicles and constructed so that there is a through flow space between the piston and the cylinder wall for the damping fluid to flow controlled by plate valves. These plate valves are under the influence of a foam material having closed pores of such structure that these foam material members are influenced by temperature changes in the damping fluid with the area of the passages controlled by the plate valves in such a way that by equal dammed-up pressure with increasing temperature, the area of the passages will diminish. The foam material inserts subject to temperature variations will be provided in grooves of the piston surfaces.

It is an object of the present invention to provide a piston structure which will include means to compensate for variations of temperature of the damping fluid. A further object of the invention resides in the piston structure in which a foam cushion is enclosed in a housing separating it from the cylinder wall and the piston rod, providing a temperature sensitive element, e.g., an air, gas or liquid filled bag or a foam cushion with closed pores, between the side of said housing facing the piston rod and the piston rod itself, such bag governing the clearance space for the flow of liquid between the inside surface of the housing and the piston rod.

Further objects will be apparent from the following description when considered in connection with the accompanying drawing which is a longitudinal section through the piston, the piston rod and the cylinder.

The foam cushion 11a is enclosed by a casing 13 separating it from the inner wall of the cylinder 5 and the piston rod 3a, the casing having apertures 14, 15 and 16. These apertures 14 and 15 are closed by flap valves 17 and 18 which operate in the manner of non-return valves whose travel upwards or downwards respectively is limited by discs 19 and 20. The discs 19 and 20 are also used as supports for the piston rings 20a, which are of U-shaped cross section and are conveniently made of plastic material and have apertures 21 and 22 through which the damping liquid can pass. The flow of liquid from one side of the piston to the other, and hence the characteristic performance of the shock absorber, are regulated by a flexible tube 23 which can be filled with air, gas or a liquid. At a given temperature of the damping fluid there is a clearance 25 of a certain cross sectional area between the flexible tube and the inner surface 24 of the casing 13. As the temperature of the damping liquid rises, the fluid inside the flexible tube 23 will increase in volume so that the clearance 25 decreases in area, the dynamic pressure remaining the same. In order to make it possible to adapt the width of the clearance to the required conditions in any given case easily and without dismantling the dashpot, the space enclosed by the flexible tube 23 is connected by a non-return valve consisting of a flexible flap 26, to a longitudinal passage 27 inside the piston rod, so that the fluid pressure inside a space 28 between the tube 23 and piston rod 3a and hence the size of the clearance 25 can be accurately adjusted by means of a filler connection not shown in the drawing. The beaded reinforced edges of the flexible tube 23 press closely against the piston rod 3a due to their own pretension and the pressure of the sealing rings 29, 30.

Between the discs 19 and 20 there is provided a mass of resilient compressible material 11a of approximately ring shape in cross section and composed of a foam artificial material as for example of polyurethane foam whose pore volume is measured so that at least a part will compensate the volume of the piston rod and simultaneously at least partly will compensate for the expansion due to temperature variations of the damping liquid. The foam material cushion 11a is enclosed by an outer casing 13 and an inner casing 13a around the piston rod 3a and the part, that is the inner part 13a, has openings 14, 15 and 16 therein. The openings 14 and 15 are closed by flap valves 17 and 18 which move upwardly and downwardly by the disc as plate-like single pistons 19 and 20 to limit the through flow openings 21 and 22. The control of the fluid flow from one side of the piston to the other and thereby regulating the damping characteristics, operates the flexible element 23 with the medium being a fluid, air or a gas in the flexible element. Between the flexible tube element 23 and the inner surface of the inner housing part 13a, the damping fluid operates under damming pressure of the fluid at the definite temperature of the damming medium through a slot of a definite size. If the temperature of the damping medium rises, the medium in tube element 23 will also expand so that the clearance 25 will become smaller at the same damping pressure. The apertures 16 in the inner wall of casing 13a are also used for the regulation of the dashpot characteristic in that they provide an additional bypass for the damping liquid apart from the passages 15 and 22. Action of the dashpot can therefore largely be determined by suitable arrangement of these apertures, their number, size and location at different heights, without disadvantageous effect on the temperature compensation provided by the flexible tube 23.

I claim:

1. A single tube hydraulic shock absorber comprising in combination, a cylinder having cylindrical walls, a piston rod, spaced piston heads secured to said rod and movable therewith relative to said cylinder within the latter, said cylinder having a movement damping liquid therein, a mass of resilient compressible material located between said piston heads and exposed to the pressure of said liquid, a container for said material whereby the latter is held away from said wall and said rod, a gas filled tube of resilient material disposed concentrically around said rod and having its ends maintained by tension in close contact with said rod, and a filler connection for said tube, said rod having therein a passage in communication with said connection and accessible externally of said cylinder.

2. A single tube hydraulic shock absorber according to claim 1, in which a non-return valve is provided located between said filler connection and said tube.

3. A single tube hydraulic shock absorber according to claim 1, in which a said passage therein terminates in a flexible flap in the space between the tube and the rod.

4. A single tube hydraulic shock absorber according to claim 1, in which a casing is provided between the piston heads and the space between the tube and the casing having openings in the casing to communicate said space with the inside space of the casing.

References Cited in the file of this patent

UNITED STATES PATENTS

| | | |
|---|---|---|
| 2,357,278 | O'Connor | Aug. 29, 1944 |
| 3,042,154 | Zeidler | July 3, 1962 |
| 3,056,473 | Zeidler | Oct. 2, 1962 |